E. E. NOVOTNY.
PRINTING PLATE AND MATRIX.
APPLICATION FILED MAR. 15, 1920.

1,401,633. Patented Dec. 27, 1921.

Inventor
Emil E. Novotny
By his Attorneys
Myers, Cavanagh & Hyde

UNITED STATES PATENT OFFICE.

EMIL E. NOVOTNY, OF PHILADELPHIA, PENNSYLVANIA, ASSIGNOR TO JOHN STOGDELL STOKES, OF PHILADELPHIA, PENNSYLVANIA.

PRINTING-PLATE AND MATRIX.

1,401,633.        Specification of Letters Patent.        Patented Dec. 27, 1921.

Application filed March 15, 1920. Serial No. 366,098.

*To all whom it may concern:*

Be it known, that I, EMIL E. NOVOTNY, a citizen of the United States, and resident of Logan, Philadelphia, in the county of Philadelphia and State of Pennsylvania, have invented certain new and useful Improvements in Printing-Plates and Matrices, of which the following is a specification.

This invention relates to printing plates and matrices therefor, and has particular application to plates and matrices embodying in their structure a hardened and set acetic aldehyde or paraldehyde condensation product.

Heretofore in the manufacture of molded printing plates and matrices I have used synthetic resins, usually in combination with other materials, such as fiber board, and the like. The synthetic resins which I have heretofore employed have been in the nature of condensation products produced by the reaction of phenol or cresol and formaldehyde. While these formaldehyde condensation products have proven adaptable for the intended purpose, yet there are certain factors incident to their use which should be eliminated, if possible. For example, a formaldehyde condensation product is relatively expensive and possesses a high shrinkage characteristic which frequently, during or after a molding operation, results in the sticking or interlocking of the printing plate to the matrix, particularly where the face of the latter is also made from such a condensation product. Such sticking or interlocking, of course, presents the liability of injuring both the matrix and plate in attempting separation. Furthermore, in the molded article such a condensation product has a tendency to cause warping or buckling so that great care must be taken to produce plates of the proper uniformity and flatness.

In making the plate and matrix forming the subject matter of the present invention, I use an acetic aldehyde or a polymer thereof such as paraldehyde condensation product composition as contradistinguished from a composition including a formaldehyde condensation product, and I have discovered that by so doing I obtain certain very advantageous results which will be hereinafter mentioned.

I will briefly state that the printing plate and matrix described herein are preferably composed of a fibrous substance, such as news board, chip board, card board, or the like, having incorporated therein, and coated with, a condensation product formed by the reaction of a phenol or cresol and an acetic aldehyde ($CH_3$—CHO) and preferably with the addition of a suitable catalytic agent as hereinafter set forth.

Figure 1:
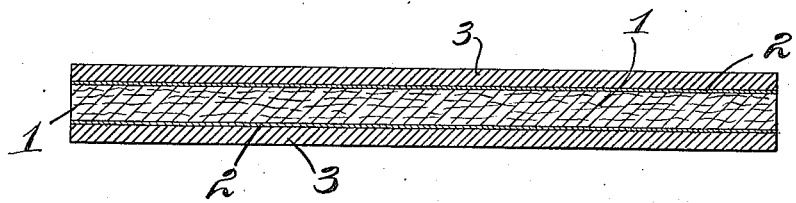
Figure 1, is a cross sectional view of a blank which may be used for making the matrix shown in Fig. 2 and also the printing plate shown in Fig. 3.

In making the printing plate and the matrix hereof I prefer to use the blank shown in Fig. 1. This blank comprises a body section 1, either in the nature of a single sheet, or of a plurality of sheets or laminations, and it is preferably composed of fibrous material, impregnated but not saturated with an acetic aldehyde condensation product, which has been hardened and set, so as to reinforce and strengthen the fibrous substance, yet permit of the latter undergoing the proper degree of compression in the molding operation, the molding taking place without the side-flow of the material which occurs when working upon a body composed entirely of a plastic or partially plastic mass, such as a pure phenolic condensation product, or a phenolic condensation product loaded with a powdered filler. This body section 1 of the blank is provided with intermediate face coatings 2 in the nature of skin-like films or layers composed of partially hardened and set, or of partially reacted acetic aldehyde condensation product. These coatings 2 act as barriers to prevent the outer or exterior and richer coating 3, also formed of a partially reacted acetic aldehyde condensation product, from penetrating or being forced into the fibrous body 1 during the molding of the article. The exterior coatings 3 may be made thicker than the coatings 2 and of a richer product if desired. The entire blank is treated as hereinafter described preliminary to its use in molding the article. The fibrous body section 1 is preferably composed of an open fibrous sheet-like material such as card board, although it may be of any substance suitable for the purpose, such as chip board, news board, ply wood, felt, laminated paper, wood fiber, or a blank of one or more laminations of textile material, such as cotton or wool or fiber made therefrom. I prefer to use such fibrous substances because each of those mentioned possesses the characteristic of being compressible under pressure in molding without having any undue spreading or sideflow action.

I preferably impregnate this base 1, with a condensation product formed by the reaction of phenol or cresol and an acetic aldehyde or a polymer thereof such as paraldehyde.

In making this condensation product I may, for example, use approximately one hundred parts of phenol to seventy five parts of acetaldehyde, in conjunction with a mineral acid, such as hydrochloric acid or sulfuric acid of suitable strength, to act as a catalyst while the constituents are undergoing reaction. When the condensation product has been produced, this catalyst should be eliminated or neutralized. Hydrochloric acid may be eliminated for example, by passing live steam through the mass, or both the acids may be neutralized by introducing a sufficient quantity of an alkali. For example, ammonia may be added to counteract or neutralize the acid.

This condensation product when thoroughly dehydrated may be made in the form of a powder, or a varnish when in solution with alcohol, acetone, benzol, or a combination of these. It differs from phenol-formaldehyde condensation products in that it is capable of retaining, to a great extent, its thermoplastic properties, and, therefore, may be used for cold-molding much as shellac-molding plastics are used. If desired this condensation product can be set to a hard and infusible form by prolonged heating in an oven.

For most purposes it is desirable to secure a quick reaction in preparing the product, and I, therefore, prefer to add to the batch of material a small quantity of a final catalyst such as about two per cent. of nigrosin black, or zinc chlorid, which causes a quick reaction. I may also mix with the condensation product suitable colors, pigments and fillers, if deemed desirable.

Of course, at the time of impregnating the base 1 with this acetic aldehyde condensation product, the latter is in a syrupy or liquid form, or in solution. In impregnating the base 1, I do not completely saturate the fibrous material with the condensation product, that is to say, I do not load the cells of the fiber to their full capacity, but I simply impregnate the fiber so that when dried out it will contain but the minimum amount of condensation product consistent with my purpose. I prefer to resort to this minimum impregnation in order that my composition material, when being molded to form an article, will still be capable of compression due to the fact that its cellular construction is not entirely filled with the cement-like condensation product. In preparing the condensation product solution I prefer to use a mixture composed of equal parts of alcohol and benzol, as this enables me to remove all the water contained in the fiber body much more rapidly than if a single solution be used. My condensation solution may be composed of one part of the condensation produce mixed with twenty parts of the alcohol-benzol solvent. However, I do not confine myself to these specific proportions for the solution or to the use of alcohol and benzol, or either of these, as other solvents such as acetone may be used. In impregnating the base 1, the fiber sheets constituting the same are placed in a bath of the condensation solution for a sufficient length of time to become impregnated. The fibrous sheets are then drained in tanks, in order to salvage the excess condensation solution dripping therefrom. They are then placed in vacuum ovens, where, at a suitable temperature, for instance, from one hundred to three hundred degrees F., the solvents are removed, together with any moisture in the material, so that the condensation product in the body is set or hardened, either wholly or partially, just as may be desired for the particular work to be done. Upon removing the impregnated fibrous sheets or blanks from the oven, they will be found dry and resistant to moisture and also stiff enough to provide sufficient resistance to compression, as is desirable in the molding operation.

The now impregnated and dried fibrous base 1 is then coated, preferably upon both faces, with a film or layer of the acetic aldehyde condensation product, to form the barrier layer 2. The sheet so coated is replaced in the vacuum oven and heated or cooked for a suitable length of time, say from five to thirty minutes, in order to set the coatings, thereby forming skin-like films. These layers or films 2, however, are not hardened to final infusible form but are still capable of being fashioned under pressure. After these layers 2 have been hardened to their skin-like form the blank is removed from the oven and the outer or exterior coatings 3 are preferably applied to both sides thereof and directly upon the layers 2. The blank as thus finally coated is again placed in the vacuum oven and heated for a suitable length of time, say from five to fifteen minutes at a temperature of from 100 to 200 degrees F., until the upper coating assumes a skin-like condition and is partially hardened, so that it is no longer sticky, tacky or capable of flowing freely, but yet is capable of taking molding impressions under pressure against a matrix or the like.

For some purposes, where it is desired to polish the outer faces, the latter, coated as described may be placed between the platens of a warm press for a brief time, say one or two minutes, and pressed so as to give the blank a true flat form and to impart to the surface thereof a smooth polished finish. For this purpose the blank may also be rolled between the cylinders of a cellular heated calendering machine.

The pre-cooked blank as thus finished is now ready for use.

Figure 2:
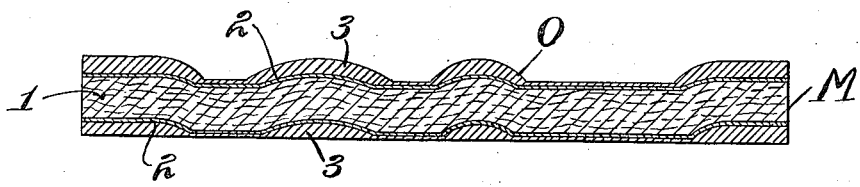
Fig. 2, is a cross sectional view of my improved matrix.
Figure 3:
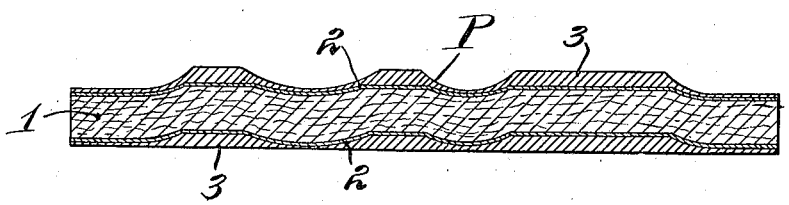
Fig. 3, is a similar view of a printing plate made from the blank shown in Fig. 1.

In making the printing plate matrix indicated as an entirety by the letter O in Fig. 2, the blank of Fig. 1 is employed. This blank may be imposed upon the body of type, etching or other type matter to be produced, and which is locked in the chase in the ordinary manner. The type form and blank thus assembled may then be placed in a suitable press of any well known construction, such as one having flat, hollow platens which are adapted to be heated and cooled as the occasion may require. Suitable bearer bars may be used between the platens of the press merely for the purpose of limiting the closing of the platens or the distance they may move toward each other. In the closed press the blank on the type form is subjected to heat and pressure until the blank is molded to form the matrix shown in Fig. 2, with the usual molding face formed of elevations and depressions. The heating and pressure will cause the material of the matrix to set to a hard, infusible form, and while under pressure on the type form the matrix may be cooled, or it may be stripped from the type form and allowed to cool naturally.

In making the printing plate indicated as an entirety by the letter P, this acetic aldehyde composition matrix of Fig. 2 may be advantageously employed, as the surface thereof is so smooth, polished and hard that the plate material will not adhere thereto to such an extent as to prevent separation. The matrix, with the blank of Fig. 1 is placed between the platens of the press, and the latter are closed to apply heat and pressure, at suitable temperature, for example, from 270 to 330 degrees F., for from 2 to 5 minutes. After the plate shown at P has been molded, it may be cooled while on the matrix in the press, or the plate may be stripped and cooled after removal from the press. If desired both the plate and matrix may be further heated after being molded, to insure a very hard and infusible article.

If desired, both the matrix and printing plate may be made with but a single surface skin-like layer of the condensation product, and this layer may be applied to both faces, or to but one face as deemed advisable. Furthermore, the fibrous material need not be impregnated with the condensation product, although in practice I prefer to impregnate the fiber, and to use the double skin of condensation product, as high grade results are obtained by such a construction.

As but relatively little condensation product is employed in making the articles, the latter may be produced in great quantities at an exceedingly low cost far below that of the condensation material itself, so that articles may be produced much more economically of my composition material than from a solid body of a condensation product. The use of acetic aldehyde condensation product possesses manifest advantages over the use of phenol and formaldehyde condensation products, because not only is the cost of producing the acetic aldehyde condensation product approximately one third of the cost of the phenol and formaldehyde condensation product, but possessing as it does a much lower shrinkage characteristic, it will, when united with fiber produce a flatter and more suitable structure, because warping will not result to the same extent as occurs when fiber is impregnated or coated with a formaldehyde condensatiton product, and, furthermore, because of its lower shrinkage factor the material, during molding, will not interlock with overhangs or recesses in the matrix, as is likely to occur with a formaldehyde condensation product.

While I have herein shown and described a preferred embodiment of my invention, I wish it to be understood that I do not limit myself to all the precise details herein set forth by way of illustration, as modification and variation may be made without departting from the spirit of the invention or exceeding the scope of the appended claims.

What I claim is:

1. As a new article of manufacture, a printing plate having a printing face of a hard acetic aldehyde condensation product.

2. As a new article of manufacture, a printing plate comprising a body portion of suitable material provided with a hard acetic aldehyde condensation product face portion having depressions and elevations forming a printing plate.

3. As a new article of manufacture, a printing plate comprising a body portion of porous material impregnated with a hardened cement-like substance, and having a printing face formed by a hard acetic aldehyde condensation product.

4. As a new article of manufacture, a printing plate comprising a fibrous body portion, and a printing face therefor composed of an acetic aldehyde condensation product.

5. As a new article of manufacture, a printing plate comprising a body portion having a plurality of coatings of hard acetic aldehyde condensation product, one of said coatings having elevations and depressions therein to provide a printing surface.

6. As a new article of manufacture, a printing plate comprising a fibrous body portion having a hard and set acetic aldehyde condensation product incorporated therein, said body portion having a face section constituting a printing plate.

7. As a new article of manufacture, a printing plate comprising a fibrous body portion impregnated with a hardened acetic aldehyde condensation product, and having a plurality of layers of hard acetic aldehyde condensation product imposed thereon to form a barrier layer and an exterior layer, said exterior layer constituting the printing face of the plate.

8. As a new article of manufacture, a printing plate comprising a body of hard acetic aldehyde condensation product having elevations and depressions to form a printing plate.

9. As a new article of manufacture, a printing plate matrix having a body portion including a hard acetic aldehyde condensation product, said body portion having a molding face.

10. As a new article of manufacture, a printing plate matrix having a molding face formed from a hard and set acetic aldehyde condensation product.

Signed at New York city, in the county of New York and State of New York, this 26th day of February, 1920.

EMIL E. NOVOTNY.